March 28, 1950 J. SCHULTES ET AL 2,502,235
SPIRIT LEVEL
Filed June 8, 1946
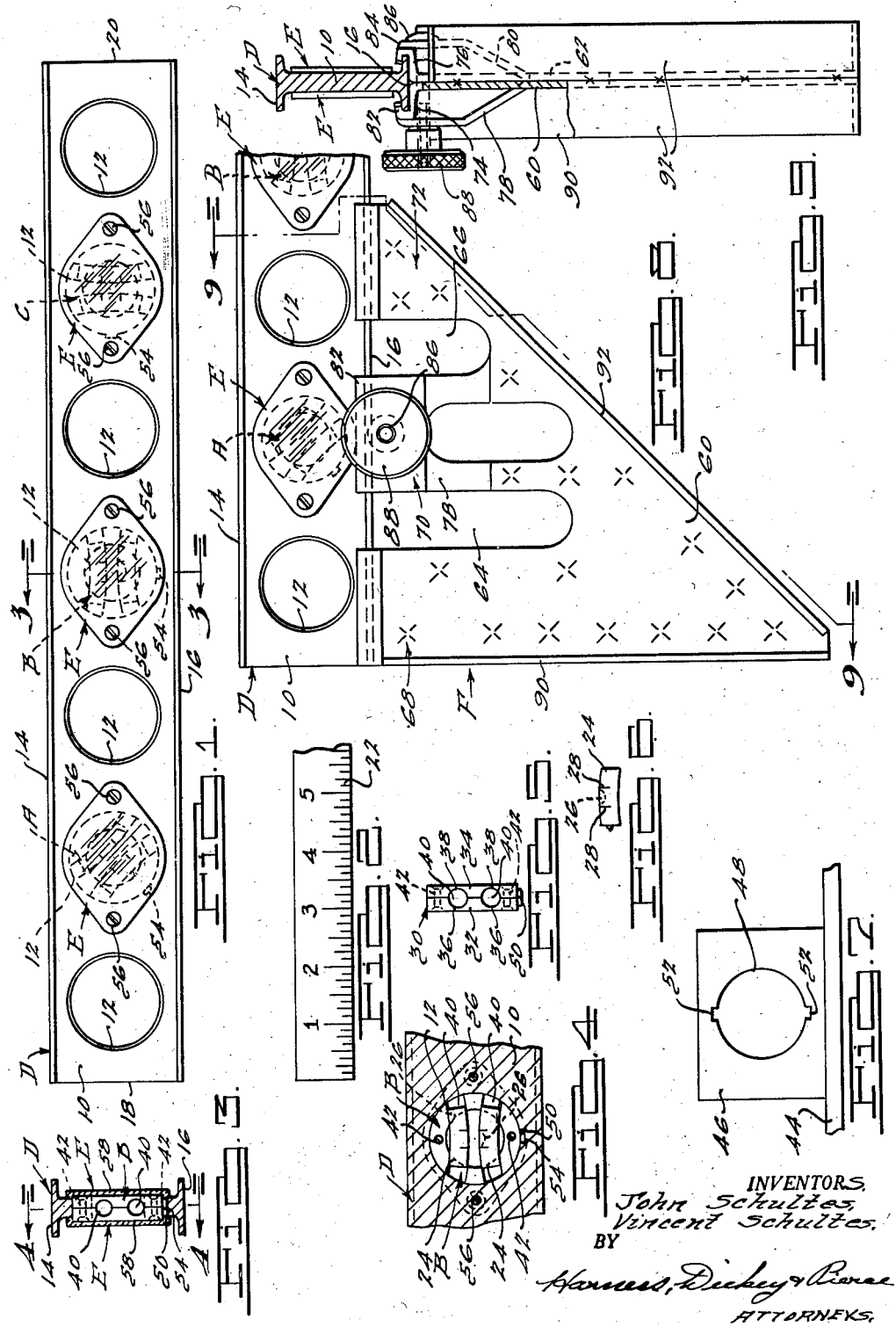
INVENTORS.
John Schultes,
Vincent Schultes,
BY
Harness, Dickey & Pierce
ATTORNEYS.

Patented Mar. 28, 1950

2,502,235

UNITED STATES PATENT OFFICE 2,502,235

SPIRIT LEVEL

John Schultes and Vincent Schultes,
Detroit, Mich.

Application June 8, 1946, Serial No. 675,396

2 Claims. (Cl. 33—213)

This invention relates to new and useful improvements in spirit levels and to a novel combination of spirit level and square.

An important object of the present invention is to provide a spirit level having a work-engaging or testing edge and a plurality of indicator units positioned to register accurately when the work-engaging edge is disposed at different predetermined angles from the horizontal.

Another object of the invention is to provide a spirit level of the above-mentioned character in which the indicator units are of contrasting colors so that the user can distinguish them at a glance.

Still another object of the invention is to provide a spirit level of the above-mentioned character in which the indicator units are preassembled at the factory and uniquely mounted in the body of the level in such manner that, if it becomes necessary to replace them with a new factory adjusted unit, the latter is automatically and accurately positioned to register the predetermined angle of such unit.

Yet another object of the invention is to provide a spirit level of the above-mentioned character in which the indicator units are retained in the body by covers of a suitable transparent or translucent material which covers also fit snugly or tightly against the body of the level to provide waterproof and dustproof joints around the units.

A further object of the invention is to provide a novel indicator unit which includes an indicating vial and a vial retainer and having provision for easily and quickly adjusting the vial in the retainer.

A still further object of the invention is to provide a spirit level that can be readily manufactured in different lengths and at a minimum of cost.

A yet further object of the invention is to provide a spirit level and square combination which includes novel means for holding the level and square together and wherein the level is readily adjustable on the square.

Other objects and advantages of the invention will be apparent during the course of the following description.

In the drawing forming a part of this specification and wherein like numerals are employed to designate like parts throughout the same, Fig. 1 is a side elevational view of a spirit level embodying the invention, Fig. 2 is a fragmentary edge elevational view thereof, Fig. 3 is a transverse sectional view taken on the line 3—3 of Fig. 1, Fig. 4 is a fragmentary longitudinal sectional view taken on the line 4—4 of Fig. 3, Fig. 5 is an edgewise elevational view of the vial retainer which comprises a part of the indicator unit, Fig. 6 is a side elevational view of a vial which together with the retainer shown in Fig. 5 forms an indicator unit of the spirit level, Fig. 7 is a side elevational view of a suitable jig for accurately assembling the vial and vial retainer, Fig. 8 is a side elevational view of a square embodying the invention and showing the same associated with a fragmentary portion of the spirit level, and Fig. 9 is a vertical sectional view taken on the line 9—9 of Fig. 8.

In the drawing, wherein for purposes of illustration is shown a preferred embodiment of the invention, attention is first directed to Figs. 1–7 which show the novel features and construction of the spirit level, per se. According to the present invention three indicator units A, B and C are mounted in longitudinally spaced relation in suitable sockets provided in a body D and each unit is adapted to register a different angular position of the body with respect to the horizontal. These units are retained in their respective sockets and in fixed association with the body D by suitable transparent covers E. It is to be understood, however, that although three level indicator units are here shown by way of illustration, the number of units employed is not critical. Any desired number of units can be used.

The support D preferably is made of plastic or extruded aluminum bar stock and is generally I-shaped in transverse section as shown in Fig. 3. In practice, carpenters, machinists and other craftsmen require levels of varying size and length and it is contemplated that the body D be formed merely by cutting a piece of a desired length from stock material of suitable size. It will be observed that the central web portion 10 is provided at spaced intervals along its length with holes 12. Alternate holes 12 define sockets for the level indicator units A, B and C and the others merely serve to lighten the body D. The upper and lower edges 14 and 16, which are flat, exactly parallel and precisely at right angles to the ends 18 and 20, provide accurate work-engaging or testing surfaces. Also, the upper and lower edges 14 and 16 preferably are provided with suitable scales 22, as shown in Fig. 2, for convenience of the user and in order to permit the level to function as a rule.

The indicator units A, B and C are identical in construction but, as suggested, they are mounted at different predetermined angles in the body D. For example, in the arrangement here shown by way of illustration, the unit A is mounted to indicate when the work-testing surfaces 14 and 16 are disposed at an angle of 45°, the unit B is mounted to indicate when the work-testing surfaces are disposed horizontally and the unit C is mounted to indicate when the work-testing surfaces are disposed upright or perpendicular.

Each of the level indicator units includes a pair of glass vials 24 which are filled with the usual liquid in such manner as to form a bubble 26 therein. The vials are generally cylindrical in transverse section and arcuately curved longitudinally, as shown in Fig. 6. On the top surface of each vial 24 is a pair of longitudinally spaced transverse marks 28 which indicate when the bubble 26 is centered therein.

The two vials 24 are mounted in a retainer 30 which comprises two ring-shaped members 32 and 34 disposed side-by-side and having registering grooves 36 and 38 in their mating surfaces. These grooves 36 and 38 collectively define a pair of tubular passages 40 which snugly receive respective vials 24. As best shown in Fig. 4, the passages 40 extend through the plane of the retainer 30 and are curved longitudinally in opposite directions and on the same radius as the vials 24. It will be observed that the passages 40 are longer than the vials 24 so that the latter can be shifted or adjusted back and forth therein. Also, the passages 40 open into the open center portions of the ring-shaped members 32 and 34. Thus the vials 24 extend through the open center portions of members 32 and 34 and the bubbles 26 are easily visible in such open-center portions. Members 32 and 34 can be made of any suitable material but preferably and conveniently are made of a suitable colored transparent plastic and are fastened together in any suitable manner, as by rivets 42. By reason of the fact that passages 40 open through the edges of the retainer 30, vials 24 can be inserted in their respective passages after the retainer sections 32 and 34 have been assembled. This feature permits easy replacement of either vial should it become broken or damaged.

In order that the vials 24 register accurately when the indicator units A, B and C are assembled in the body D it obviously is necessary that there be some correlation between the position of retainers 30 during initial adjustment of the vials and the position of the retainer in the support. According to the present invention this correlation is accomplished by making the initial adjustment in a jig of the type shown in Fig. 7. The jig comprises a base 44 having an upstanding flange or wall portion 46 and the latter is provided with an opening 48 which is shaped to snugly receive a vial retainer 30. Formed integrally on the periphery of the retainer 30, and at a point where the radii of passages 40 intersect the periphery, is a radially projecting lug or guide 50. When the vial retainer 30 is mounted in the jig, the guide 50 is positioned in either of diametrically opposed recesses or guideways 52 which extend radially from the opening 48. These guideways are located on a precisely vertical diameter of the opening 48 and thus accurately position the retainer 30 with the radii absolutely vertical. Consequently, when the vials 24 are adjusted so that the bubbles 26 are disposed between indicator marks 28 they register a precisely horizontal position. In this connection it will be apparent that the vial 24 closest to the lug 50 is adjusted when the latter is disposed in the lower guideway 52 and that the vial 24 remote from guide 50 is adjusted with the latter disposed in the upper guideway 52. The upstanding flange 46 preferably is relatively thin to at least partially expose the ends of passages 40, or alternatively the vial retainer 30 is inserted only part way in opening 48 in such manner that the ends of passages 40 are at least partially exposed so that a suitable instrument can be inserted to move the vial longitudinally therein. When properly adjusted the vials are secured by a suitable cement or adhesive whereby to prevent them from shifting inadvertently and also to prevent unauthorized or inexperienced persons from disassembling the units and moving the vials out of adjustment.

The openings 12 also are provided with guideways 54 which snugly receive the projecting guide 50 of its respective indicator unit A, B or C and from left to right, the guideways 54 are disposed precisely at an angle of 45° with respect to, perpendicular to, and horizontal to the work-testing surfaces 14 and 16. Since these guideways 54 are precisely located and since they determine the position of the vial retainers 30 in the body D, the indicator units A, B and C accurately register angles of 45°, 0°, and 90° respectively. Moreover, any similar and similarly preadjusted indicator unit can be substituted for any of those in the body D and it will automatically be positioned to register accurately the angle of the opening 12 in which it is mounted. It will be readily apparent to those skilled in the art that the two vials 24 in each unit are used in conjunction with respective measuring surfaces 14 and 16.

Each of the vial retainers 30 project at both sides of the web 10, as shown in Fig. 3, and the guide 50 is cut back from the faces of the retainer to extend flush with the web and provide continuous projecting annular surfaces. Fitting snugly over the projecting portions of the retainers 30 and fastened to the web 10 by screws 56 are covers E of suitable transparent or translucent plastic material. It will be observed that each of these covers is formed in its inner face with a socket 58 which fits snugly over one projecting portion of a retainer 30 and defines a flange around the latter which seats solidly against the web 10. Thus, the covers E collectively seal indicator units A, B and C and prevent dust and moisture from gaining access thereto.

Preferably, covers E are transparent, colored differently and in contrasting colors so that the user can easily distinguish the three indicator units at a glance. For example, it is contemplated that the retainers from left to right in Fig. 1 be colored amber, green and red, respectively.

Attention is now directed to Figs. 8 and 9 which show the spirit level hereinabove described uniquely associated with a square in such manner that its utility is substantially enhanced. The arrangement is such that the square can be placed either with one side or any of its three edges against the surface to be tested and the spirit level is adjustable longitudinally on the square so that all of the free edges of the latter can be used regardless of the length of the level.

The square here shown by way of illustration is generally triangular in plan and preferably is formed from two identical pieces 60 and 62 of sheet metal, which pieces are placed side-by-side or back-to-back and spot welded or otherwise fastened together. Extending from one edge of the square are cutout portions 64 and 66 which define separate sections 68, 70 and 72.

According to the present invention the marginal portions of the end sections 68 and 72 have outturned flanges 74 and 76 which extend in opposite directions and in the same plane to provide a flat seat for one longitudinal edge of the spirit level. As best shown in Fig. 9, the outer portions of flanges 74 and 76 are bent upwardly and inwardly to extend over the base flanges of the body D and to define a guideway therefor. It will be observed that this guideway snugly fits the base flanges of the body D so as to prevent play between the spirit level and square, but the spirit level is adjustable longitudinally in the guideway.

The portions 78 and 80 of the middle section 70 are unattached and extend outwardly in divergent relation to define clamping arms, as best shown in Fig. 9. Adjacent their outer or distal edges arms 78 and 80 are disposed against and in embracing relation to the base flanges of the body D and the margins 82 and 84 thereof are inturned to overlie the base flanges of the body. Connecting arms 78 and 80 adjacent their distal edges is a clamping screw 86 which carries a large-headed manually operated nut 88.

When the nut 88 is tightened, arms 78 and 80 are pulled tightly against the base flanges of the body D to hold the spirit level fixedly associated with and in a selected adjusted position on the square. Conversely, when nut 88 is loosened, clamping arms 78 and 80 release the base flanges so that the spirit level can be easily adjusted longitudinally on the square.

It will also be observed that the other two edges of each plate 60 and 62 have outwardly extending flanges 90 and 92, which flanges extend beyond the gripping arms 78 and 80 and are adapted to provide a flat supporting surface for the square and spirit level when they are placed edgewise on a surface being tested and with the plate 62 down. Since the flanges 90 and 92 on plate 62 extend beyond the clamping arm 80 there is no interference from the latter or from the head of clamping screw 86. Also, the flanges 90 and 92 of plate 60 can be used in the same manner merely by reversing the screw 86 and nut 88.

It is to be understood that the form of the invention herewith shown and described is to be taken as a preferred example of the same and that various changes in the size, shape and arrangement of parts may be resorted to without departing from the spirit of the invention or the scope of the appended claims.

Having thus described the invention, we claim:

1. A spirit level comprising an elongated body having a work-engaging surface and a plurality of sockets; level indicator units in and projecting from the sockets at opposite sides of the body, each unit including a vial retainer and a vial mounted for visual indication in said retainer; interengaging guide means in the sockets and on said retainers which hold the latter fixed in the sockets, each of said indicating vials disposed in its respective retainer to indicate a level position when the guide means on said retainer is disposed vertically therebelow, and the guide means in said sockets disposed at different predetermined angles with respect to the work-engaging surface of the body so that the vial in each of said units is centered automatically when the work-engaging surface is disposed at an angle corresponding to the angle of the guide means in its respective socket, and whereby any of said level indicator units can be replaced by any similar and similarly pre-adjusted level indicator unit and the latter properly positioned automatically in the body by said guide means; and covers of transparent plastic material fitting over the projecting portions of said level indicator units and fastened to the body, said covers engaging opposite sides of the indicator units to hold the latter centered in the sockets and seating tightly and continuously against the body to provide waterproof and dustproof joints around the level indicator units.

2. A spirit level comprising an elongated body having a work-engaging surface and a plurality of sockets; level indicator units in and projecting from the sockets at opposite sides of the body, each unit including a vial retainer and a vial mounted for visual indication in said retainer; interengaging guide means in the sockets and on said retainers which hold the latter fixed in the sockets, each of said indicating vials disposed in its respective retainer to indicate a level position when the guide means on said retainer is disposed vertically therebelow, and the guide means in said sockets disposed at different predetermined angles with respect to the work-engaging surface of the body so that the vial in each of said units is centered automatically when the work-engaging surface is disposed at an angle corresponding to the angle of the guide means in its respective socket, and whereby any of said level indicator units can be replaced by any similar and similarly pre-adjusted level indicator unit and the latter properly positioned automatically in the body by said guide means; and covers fitting snugly over the projecting portions of the level indicator units, said covers engaging opposite sides of the indicator units to hold the latter centered in the sockets and fastened to the body and holding said units in their respective sockets, each of said covers having an inturned peripheral flange which fits snugly against its respective level indicator unit at its periphery and seats solidly against the body whereby to provide a waterproof and dustproof joint around said unit.

JOHN SCHULTES.
VINCENT SCHULTES.

REFERENCES CITED

The following references are of record in the file of this patent:

UNITED STATES PATENTS

| Number | Name | Date |
|---|---|---|
| 624,577 | Thompson | May 9, 1899 |
| 759,594 | Crawford | May 10, 1904 |
| 786,269 | Curry | Apr. 4, 1905 |
| 813,173 | Realing | Feb. 20, 1906 |
| 875,462 | Rowan | Dec. 31, 1907 |
| 883,642 | Hight | May 31, 1908 |
| 1,362,814 | Neidl | Dec. 21, 1921 |
| 1,500,710 | Kelly | July 8, 1924 |
| 1,777,429 | Charlton | Oct. 7, 1930 |
| 1,823,524 | Beecher et al. | Sept. 15, 1931 |
| 2,111,094 | Erickson | Mar. 15, 1938 |
| 2,118,470 | Melvin | May 24, 1938 |
| 2,305,678 | Cracaritis et al. | Dec. 22, 1942 |
| 2,442,265 | Cohen | May 25, 1948 |